(12) United States Patent
Ling (10) Patent No.: US 6,515,463 B2
(45) Date of Patent: Feb. 4, 2003

(54) METHOD AND CIRCUIT FOR OPTIMIZING EFFICIENCY IN A HIGH FREQUENCY SWITCHING DC-DC CONVERTER

(75) Inventor: Hok Sun Ling, Fanling (HK)

(73) Assignee: Semiconductor Components Industries LLC, Phoenix, AZ (US)

( * ) Notice: Subject to any disclaimer, the term of this patent is extended or adjusted under 35 U.S.C. 154(b) by 42 days.

(21) Appl. No.: 09/825,759

(22) Filed: Apr. 5, 2001

(65) Prior Publication Data

US 2002/0145891 A1 Oct. 10, 2002

(51) Int. Cl.[7] ................................................. G05F 3/16
(52) U.S. Cl. ........................ 323/315; 323/222; 323/317; 323/283
(58) Field of Search ............................... 323/222, 282, 323/283, 284, 285, 290, 315, 317

(56) References Cited

U.S. PATENT DOCUMENTS 6,396,250 B1 * 5/2002 Bridge ........................ 323/283

OTHER PUBLICATIONS

"A Low–Voltage CMOS DC–DC Converter for a Portable Battery–Operated System", Anthony J. Stratakos, University of California, Berkeley—Department of EECS (No date).

* cited by examiner

Primary Examiner—Jessica Han (57) ABSTRACT

A switch control (12) circuit which optimizes the efficiency of a buck or boost converter by eliminating simultaneous conductive states of the main power transistor (16) and the synchronous rectifying transistor (18). Power dissipation of the synchronous rectifying transistor (18) is minimized by reducing the amount of time (Td1 and Td2) that the intrinsic body diode of transistor (18) conducts current. Charge control circuit (53) is utilized for boost converter operation and charge control circuit (118) is utilized for buck converter operation.

17 Claims, 6 Drawing Sheets

METHOD AND CIRCUIT FOR OPTIMIZING EFFICIENCY IN A HIGH FREQUENCY SWITCHING DC-DC CONVERTER

BACKGROUND OF THE INVENTION

The present invention relates to switching mode DC to DC converters and, more particularly, to DC to DC boost or buck converters utilizing synchronous rectification.

DC to DC converters are employed in virtually all electronic devices requiring a stable power supply potential. In general, a DC (Direct Current) potential is supplied to the electronic device from either a battery or an Alternating Current (AC) rectification circuit. The DC potential is generally operating at a level which is either lower than or higher than the voltage level required by the electronic device. Boost converters are employed in applications where the electronic devices require a higher operating voltage than is supplied by the battery or the AC rectification circuit. Conversely, buck converters are employed in applications where the electronic devices require a lower operating voltage than is supplied by the battery or the AC rectification circuit.

The rectification element is applied within the boost and buck converters to allow uni-directional energy flow from the battery or the AC rectification circuit to the electronic devices. Some implementations of DC to DC converters employ a Schottky diode as the rectification element and a power transistor is generally used for the main current switch. The Schottky diode rectifiers prevent any reverse current being conducted from the load into the converter, but generally have a high power loss term during forward conduction.

Synchronous rectification circuits replace the Schottky diode with a pass transistor to perform the rectification during forward conduction as well as the current block function during reverse current conditions. Transistors employed as the rectification element exhibit much less forward current power dissipation, but measures must be taken to control the conduction state of the transistor during reverse current conditions. Allowing reverse current to flow through the synchronous rectifier from the load increases power loss dissipated by the synchronous rectifier.

Prior art synchronous rectification circuits provide synchronous control of the main and pass transistors for a majority of the current cycle, however, fail to provide adequate control during the transient states of the main and pass transistors. Prior art rectification circuits allow both the main and pass transistors to be conductive at the same time during a portion of the current cycle, allowing reverse current, or shoot-through current, to flow during the transient states. Prior art boost converters allow shoot-through current to flow from the output of the boost converter to ground. Prior art buck converters exhibit the same shoot-through current, except that the direction of the shoot-through current flows from the input to ground.

A need exists, therefore, for a synchronous rectification circuit which elimiates the shoot-through current for both boost and buck converter configurations, reducing the power loss caused by the converter which results in increased efficiency.

DETAILED DESCRIPTION OF THE DRAWINGS

Figure 1:
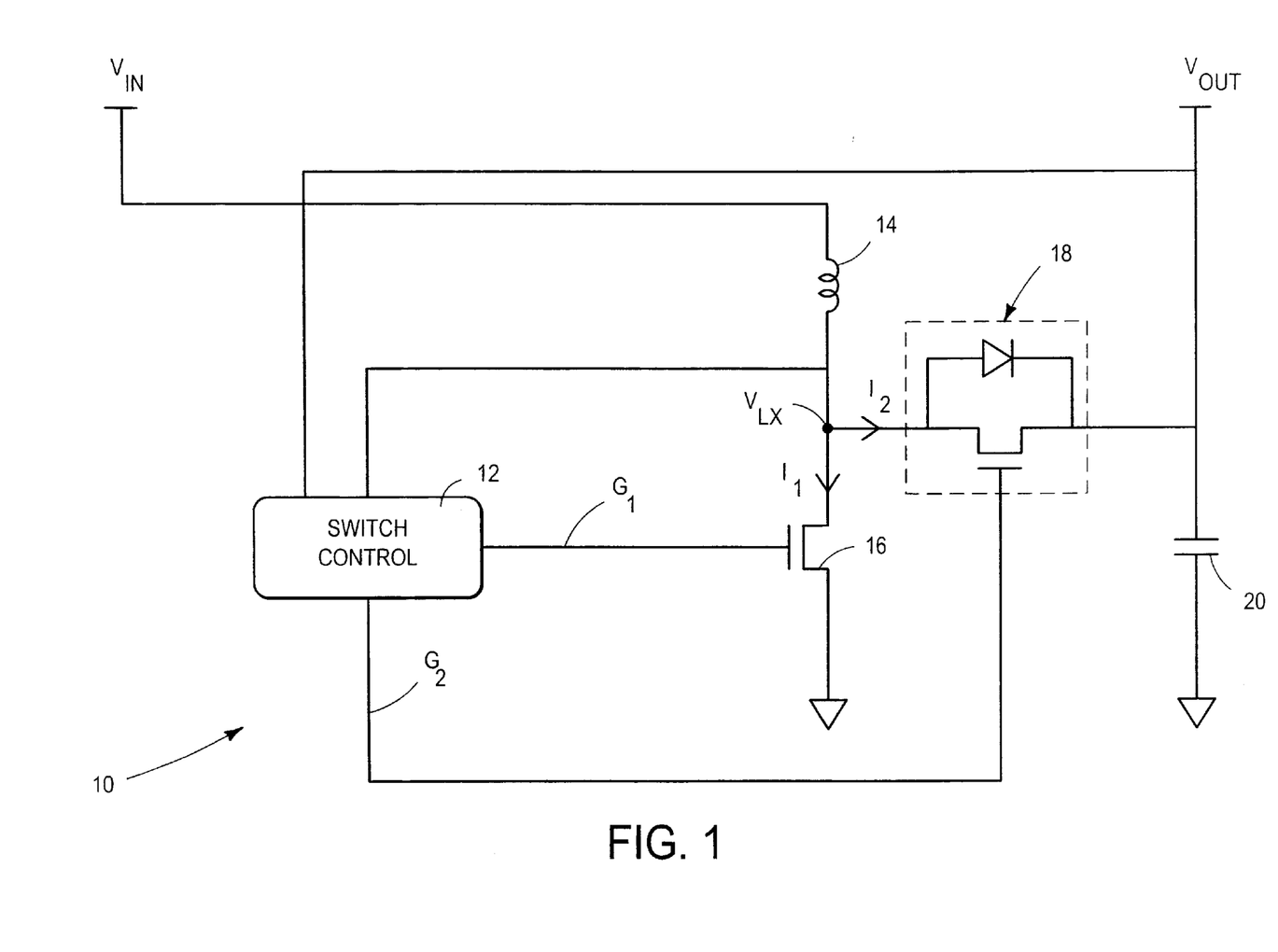
FIG. 1 is a block diagram illustrating a DC to DC boost converter.

FIG. 1 illustrates a DC to DC converter in boost configuration, whereby the magnitude of $V_{out}$ exceeds the magnitude of $V_{in}$, in boost conversion mode. Switch control 12 provides logic signals $G_1$ and $G_2$ to the gate terminals of transistors 16 and 18, respectively. Transistors 16 and 18 independently control current $I_2$ to charge capacitor 20 to the regulated voltage $V_{out}$. In operation, boost converter 10 regulates the voltage present at terminal $V_{out}$ to a level predetermined by switch control 12.

Transistor 16 is conductive in response to the gate drive signal $G_1$, causing current $I_1$ to flow and transistor 18 is non-conductive in response to signal $G_2$. Node $V_{LX}$ is substantially set to ground potential when transistor 16 is conductive, since a first terminal of transistor 16 is coupled to, for example, ground potential. During a time $T_1$, magnetic energy is stored by inductor 14 during the conductive state of transistor 16. Switch control 12 then provides control signals G1 and G2 such that transistors 16 and 18 are rendered non-conductive and conductive, respectively, at a time $T_2$. At the end of time $T_1$, transistor 16 is rendered non-conductive. Since the current induced by the inductive energy stored in inductor 14 can not change instantaneously, inductor 14 increases the voltage at node $V_{LX}$ until the forward body diode of transistor 18 is rendered conductive, where $V_{LX}=V_{out}+0.7$ volts. Current is allowed to flow from $V_{in}$ to $V_{out}$ through inductor 14 and the body diode of transistor 18. Transistor 18 is then rendered conductive by gate drive signal $G_2$ to provide a less resistive current path. An important feature of switch control 12 is the ability of switch control 12 to control the conductivity of transistor 16 and 18 synchronously. In other words, the conductive state of transistor 16 should substantially be mutually exclusive of the conductive state of transistor 18 such that transistors 16 and 18 are not simultaneously conductive.

Figure 2:
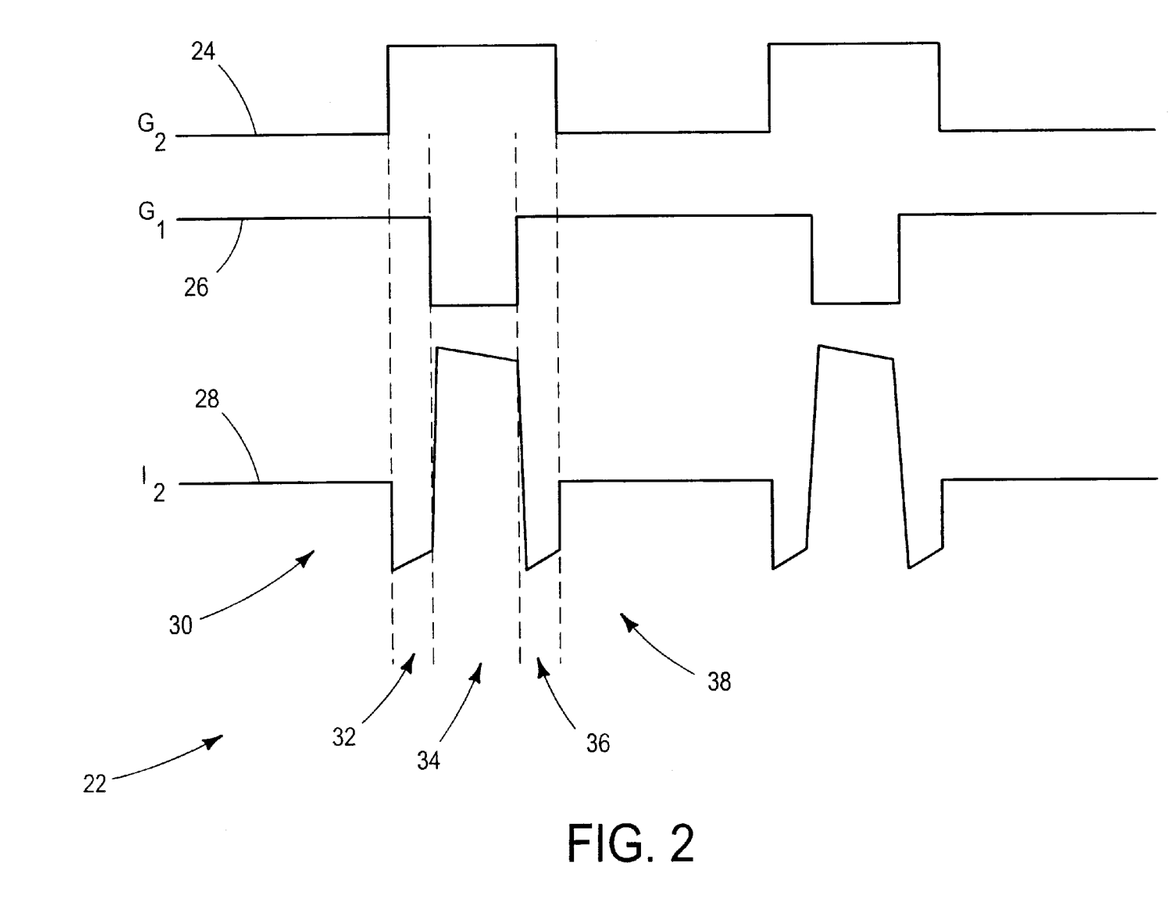
FIG. 2 is a timing diagram illustrating non-optimum control and resulting shoot-through current of a boost converter.

FIG. 2 illustrates control signals $G_1$ and $G_2$ as generated by switch control 12 in non-optimum conditions. At time 30, transistor 16 is conductive and transistor 18 is non-conductive. Current $I_2$ is zero and current $I_1$ is non-zero, since all of the current conducted by inductor 14 is taken to ground through transistor 16. At time 32, however, switch control 12 has rendered transistor 18 conductive, by setting control $G_2$ to a logic high level. Since both transistors 16 and 18 are conductive, a current path exists from capacitor 20 through transistors 16 and 18 terminating at ground terminal. A negative current spike is shown for current $I_2$ during time 32 to indicate a first current shoot-through condition. At time 34, transistor 16 is rendered non-conductive by control signal $G_1$. Current flows through capacitor 20 during time 34, charging capacitor 20 to develop voltage $V_{out}$. At time 36, both transistors 16 and 18 are rendered conductive once again, causing a second current shoot-through condition. Once transistor 18 is rendered non-conductive at time 38, the shoot-through condition is removed and current $I_2$ returns to zero. It should be noted that the first and second negative current shoot-through conditions illustrated in FIG. 2 are adverse conditions. An important feature of switch control 12 is, therefore, to prevent the occurrence of the negative current shoot-through conditions during times 32 and 36 shown in FIG. 2, by controlling the conduction state of transistors 16 and 18 such that transistors 16 and 18 are not simultaneously conductive.

Figure 3:
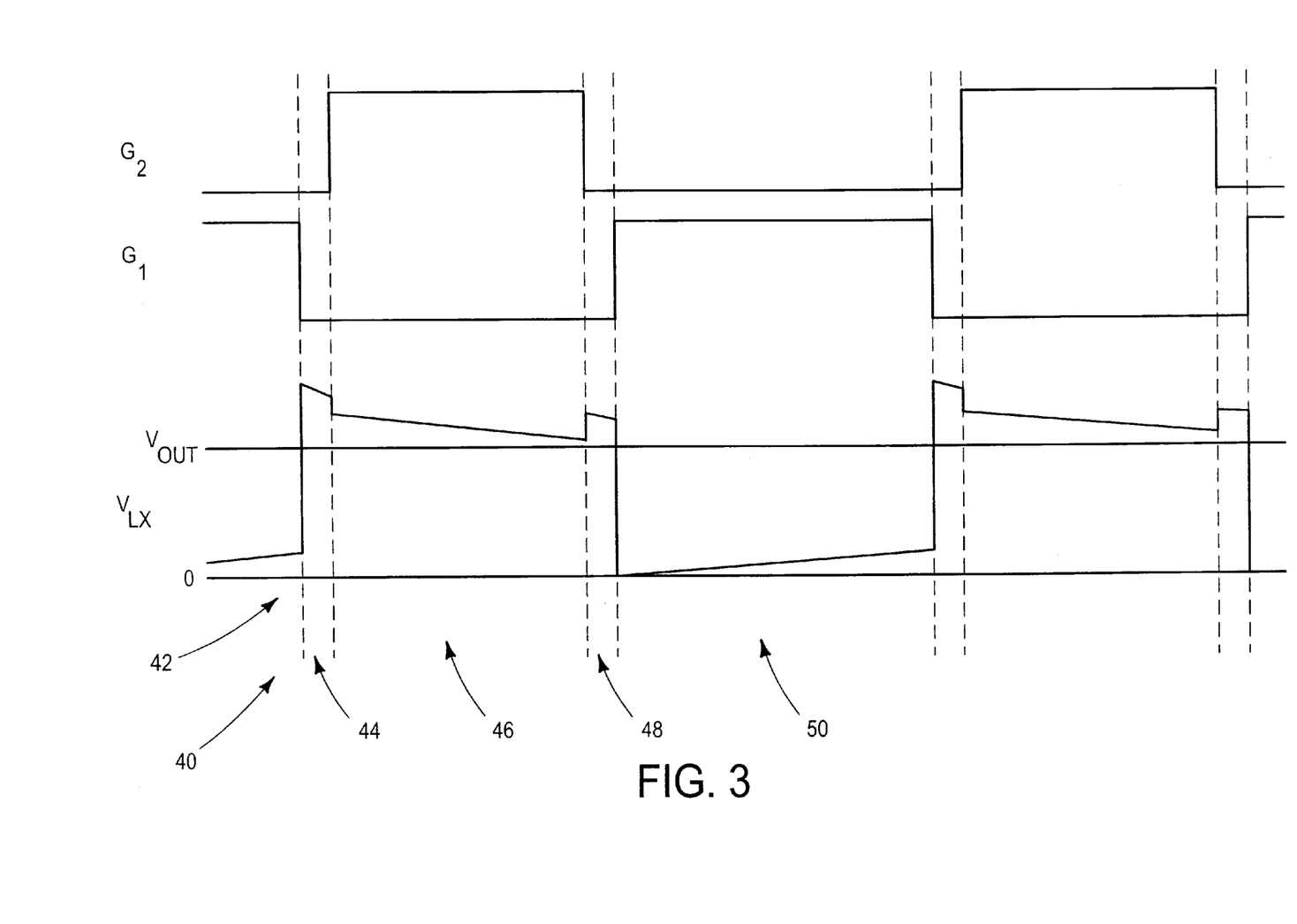
FIG. 3 is a timing diagram illustrating transistor dead times and resulting inductor fly-back voltage.

FIG. 3 displays timing diagram 40, illustrating G1 and G2 control signal waveforms and the corresponding $V_{LX}$ voltage waveform existing at node $V_{LX}$ for a boost converter configuration shown in FIG. 1. During time 42, transistor 16 is conductive and the $V_{LX}$ voltage is substantially at ground potential. As increasing current is conducted by inductor 14 during time 42, voltage $V_{LX}$ increases gradually. At the beginning of time 44, transistor 16 is rendered non-conductive, causing the voltage at node $V_{LX}$ to fly above voltage $V_{out}$, due to the magnetic energy stored within inductor 14 as discussed above. Transistor 18 contains an intrinsic body diode which is forward biased from node $V_{LX}$ to node $V_{out}$ during time 44. The body diode clamps the fly-back voltage at node $V_{LX}$ to a voltage approximately equal to 0.7 volts above the voltage at node $V_{out}$. Time 44 indicates an amount of time that transistor 16 and transistor 18 are both rendered non-conductive, also known as dead time. Dead time is required in the operation of converter 10, to eliminate the shoot-through current as shown in FIG. 2.

Time 46 illustrates a decrease in the voltage at node $V_{LX}$, as decreasing current $I_2$ is provided to node $V_{out}$ through the low impedance path provided by transistor 18. At the beginning of time 48, transistor 18 is rendered non-conductive, which provides no discharge path for current caused by magnetic energy stored in inductor 14. The voltage at node $V_{LX}$ once again flies above voltage $V_{out}$ until transistor 16 is rendered conductive. First and second dead times, illustrated during times 44 and 48 respectively, indicate conductive states for the intrinsic body diode of transistor 18. Conductive states of the intrinsic body diode of transistor 18 increases the power loss of converter 10, due to the power dissipation of the intrinsic body diode of transistor 18. Switch control 12 is therefore employed to provide two features. First, switch control 12 controls the timing of control signals $G_1$ and $G_2$, such that transistors 16 and 18 are not conductive at the same time. Second, switch control 12 minimizes the amount of time that transistors 16 and 18 are simultaneously non-conductive, in order to minimize the dead time as shown during times 44 and 48. Minimizing dead time results in reducing the amount of power dissipated by converter 10 which increases the efficiency of converter 10.

FIG. 3 illustrates times 44 and 48 as fixed width dead times. The fixed dead time in prior art controllers is, for example, 100 nanoseconds (ns), which is adequate dead time required to provide process and temperature variation margin. In general, the dead time must be longer than the turn off delays of the power transistors, in order to control current shoot-through conditions over the full operating temperature range. In other words, as temperature varies, the turn off delay of transistors 16 and 18 increases, resulting in a reduction in dead times 44 and 48. The dead times 44 and 48 are reduced to the point of non-existence and transistors 16 and 18 become conductive simultaneously, causing the shoot-through current to exist. In addition, as frequency of operation increases, the 100 ns fixed dead time becomes more significant. For example, a boost converter operating from $V_{in}$=1.8 volts to $V_{out}$=3.3 volts at 50 milli-amp (mA) loading, with a switching frequency of 600 kilo-hertz (kHz) is approximately 93% efficient. Adding a fixed 100 ns dead time, decreases the efficiency of the switching converter to approximately 89%, due to the power dissipation of the intrinsic body diode of transistor 18. At switching speeds of 1 mega-hertz (MHz), for example, the efficiency reduces further to approximately 86%.

Figure 4:
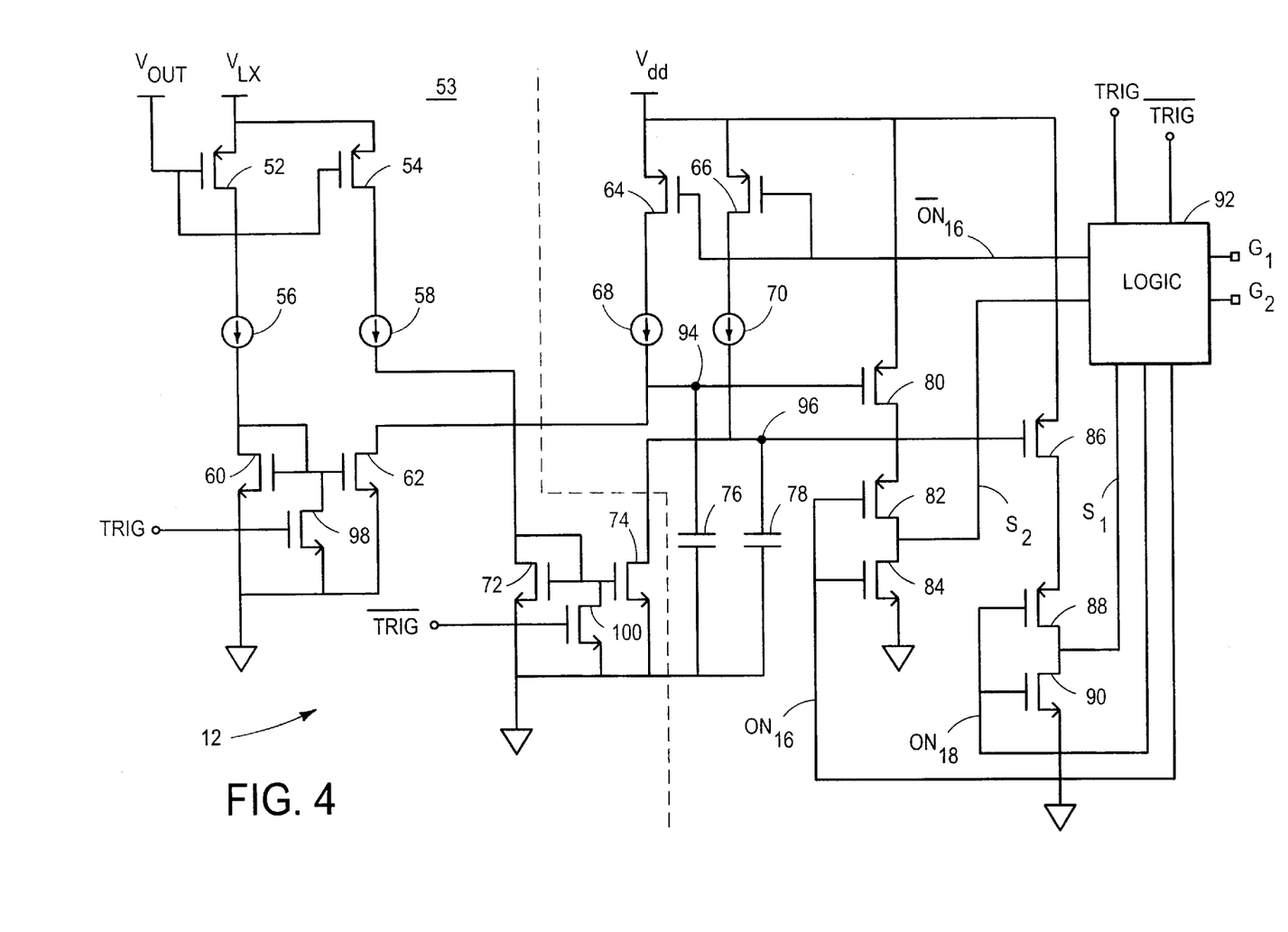
FIG. 4 is a schematic diagram of the switch control of FIG. 1.

FIG. 4 illustrates switch control 12 in boost configuration, which is designed to provide a variable dead time, resulting in a minimization of dead times 44 and 48 which increases efficiency of converter 10. First conductors of transistors 52 and 54 are coupled to node $V_{LX}$. The control terminals of transistors 52 and 54 are coupled to the output voltage node $V_{out}$. Second conductors of transistors 52 and 54 are coupled to a first conductor of current definition elements 56 and 58, respectively. A first conductor of transistor 60 is coupled to control terminals of transistors 60 and 62 and to a first conductor of transistor 98 at a second conductor of current definition element 56. Second conductors of transistors 60, 62 and 98 are coupled to a second power supply potential, for example, ground potential. A control terminal of transistor 98 is coupled to node TRIG. A first conductor of transistor 62 is coupled to a second conductor of current definition element 68, the control terminal of transistor 80 and a first conductor of capacitor 76 at node 94. A second conductor of current definition element 58 is coupled to a first conductor of transistor 72, a first conductor of transistor 100 and to the gate terminal of transistors 72 and 74. Second terminals of transistors 72, 74 and 100 are coupled to a second power supply potential, for example, ground potential. A control terminal of transistor 100 is coupled node TRIG complement. A first conductor of transistor 74 is coupled to a second conductor of current definition element 70, a first conductor of capacitor 78 and the control terminal of transistor 86 at node 96. Second terminals of transistors 64 and 66 are coupled to first terminals of current definition elements 68 and 70, respectively. First terminals of transistors 64 and 66 are coupled to a first power supply potential, $V_{dd}$. The control terminals of transistors 64 and 66 are coupled to logic 92, via control line $ON_{16}$ complement. First terminals of transistors 80 and 86 are coupled to the first power supply potential $V_{dd}$. Second terminals of transistors 80 and 86 are coupled to first terminals of transistors 82 and 88, respectively. Second terminals of transistors 82 and 88 are coupled to first terminals of transistors 84 and 90, respectively. Second terminals of transistors 84 and 90 are coupled to the second power supply potential, for example, ground potential. Control terminals of transistors 82 and 84 are coupled to logic 92 at signal $ON_{16}$. Control terminals of transistors 88 and 90 are coupled to logic 92 at signal $ON_{18}$.

In operation, voltage at nodes $V_{LX}$ and $V_{out}$ of switch control 12, controls the conductive state of p-type transistors 52 and 54. Once the voltage at node $V_{LX}$ flies above the threshold voltage of transistors 52 and 54 with respect to the gate voltage applied at node $V_{out}$, transistors 52 and 54 transition to their respective conductive states. In other words, when the body diode of transistor 18 begins to conduct current during times 44 and 48 as shown in FIG. 3, transistors 52 and 54 are conductive, allowing current definition elements 56 and 58 to provide current to transistors 60 and 72, respectively. Transistor pairs 60/62 and 72/74 provide current mirror functionality. As current is conducted by transistor 60, for example, the same amount of current is conducted by transistor 62. Likewise, as current is conducted by transistor 72, the same amount of current is conducted by transistor 74. Transistors 62 and 74 serve as current discharge transistors for capacitors 76 and 78, respectively. In other words, capacitors 76 and 78 are provided a discharge path through transistors 62 and 74, respectively, to ground potential, for example, during the conductive state of transistors 62 and 74. Once the voltage at node $V_{LX}$ no longer exceeds the threshold voltage of transistors 52 and 54, transistors 52 and 54 are rendered non-conductive. Charge control circuit 53 is therefore implemented to control current discharge from capacitors 76 and 78 in boost converter mode.

Figure 5:
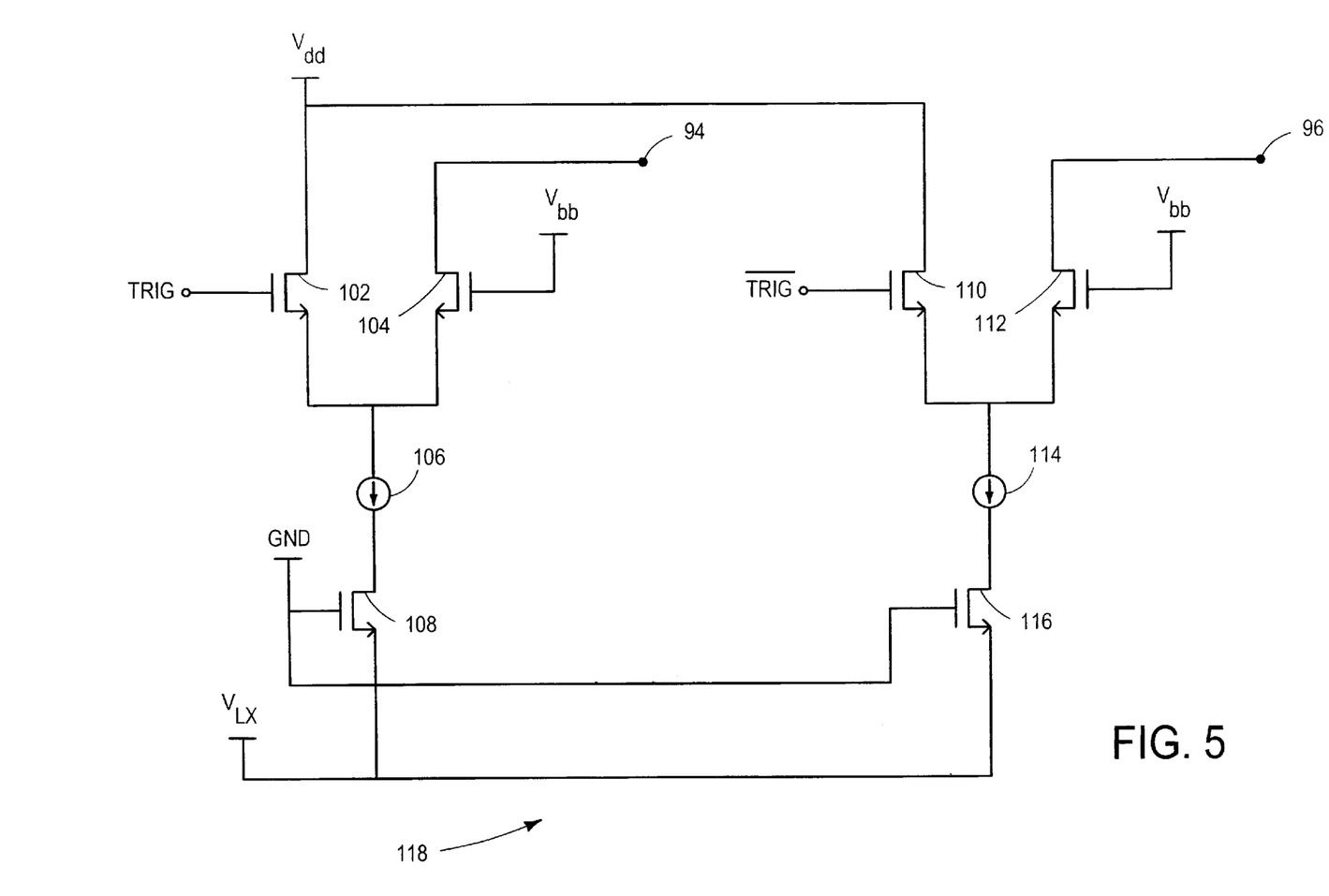
FIG. 5 is a schematic diagram of a charge control circuit for use in a switch control for a buck converter.

FIG. 5 illustrates a charge control circuit 118, which may be used in buck converter mode. Nodes 94 and 96 represent the common connection between charge control 53, for boost converter operation, and charge control 118, for buck converter operation of switch control 12. First conductors of transistors 102 and 110 are coupled to a first power supply potential $V_{dd}$. A second conductor of transistors 102 and 104 are coupled to a first conductor of current definition element 106. A second conductor of transistors 110 and 112 are coupled to a first conductor of current definition element 114. The control terminal of transistor 102 is coupled to node TRIG and the control terminal of transistor 110 is coupled to node TRIG complement. The control terminal of transistors 104 and 112 are coupled to a third power supply potential, $V_{bb}$, where $V_{bb}$ is generally set to approximately the midpoint between supply potential $V_{dd}$ and ground potential, for example. The second conductor of current definition elements 106 and 114 are coupled to the first conductor of transistors 108 and 116. The control terminal of transistors 108 and 116 are coupled to ground potential. The second conductor of transistors 108 and 116 are coupled to node $V_{LX}$. The first conductor of transistors 104 and 112 are coupled to nodes 94 and 96, respectively. Charge control circuit 118 replaces charge control circuit 53 of switch control 12 for buck converter operation.

In operation, buck converter charge control circuit 118 monitors the voltage at node $V_{LX}$. In buck converter operation, the fly-back voltage at node $V_{LX}$ of the buck converter (not shown) operates below ground potential. N-type transistors 108 and 116 are rendered conductive when the fly-back voltage falls below the threshold voltage of transistors 108 and 116, referenced to ground potential. Once conductive, transistors 108 and 116 provide discharge current, at nodes 94 and 96, respectively, supplied by current definition elements 106 and 114. The discharge current operates to discharge capacitors 76 and 78 as discussed above. Logic signals at nodes TRIG and TRIG complement operate to disable discharge current from nodes 94 and 96. A logic high at node TRIG renders transistor 102 conductive, which conducts all of the current supplied by current definition element 106, allowing no discharge current to conduct from node 94. Likewise, a logic high at node TRIG complement renders transistor 110 conductive, which conducts all of the current supplied by current definition element 114, allowing no discharge current to conduct from node 96. Charge control circuit 118, therefore, operates to discharge capacitors 76 and 78 at nodes 94 and 96, respectively, when switch control 12 is operating in a buck conversion mode.

Returning to boost converter switch control 12 of FIG. 4, the conductive states of transistors 64 and 66 are controlled by signal $ON_{16}$ complement from logic 92. Signal $ON_{16}$ complement is active low, rendering p-type transistors 64 and 66 conductive, when signal $ON_{16}$ is active high, where is the control signal commanding transistor 16 to turn on. Transistors 64 and 66, when conductive, supply charge current to capacitors 76 and 78, respectively, through current definition elements 68 and 70, respectively. It can be seen, therefore, that two branches of current exist at nodes 94 and 96. Charge current into node 94 is supplied by current definition element 68 and discharge current out of node 94 is supplied by current definition element 56. Likewise, charge current into node 96 is supplied by current definition element 70 and discharge current out of node 96 is supplied by current definition element 58. Controlling the charge and discharge currents at nodes 94 and 96 serves to provide a steady state voltage at nodes 94 and 96, using capacitors 76 and 78, respectively. It can be seen, therefore, that the charging duty cycle of capacitors 76 and 78 is controlled by the conductive state of transistor 16. Likewise, the discharging duty cycle of capacitors 76 and 78 is controlled by the dead time of converter 10, or equivalently, the time which the body diode of transistor 18 is conductive. In general, current definition elements 56 and 58 are made to be N times larger than the current definition elements 68 and 70. By establishing an amount of current supplied by current definition elements 56 and 58 to be N times the amount of current supplied by current definition elements 68 and 70, a minimization of dead times 44 and 48 is realized. The dead time of converter 10 is minimized since the dead time duty ratio is controlled to be N times smaller than the on-time duty ratio of transistor 16, by controlling the ratio of currents supplied by current definition elements 56 and 58 to the currents supplied by current definition elements 68 and 70.

Transistor pairs 82/84 and 88/90 implement inverter logic devices. A logic high $ON_{16}$ signal, for example, establishes a logic low $S_2$ signal and a logic high $ON_{18}$ signal, establishes a logic low $S_1$ signal. Transistors 80 and 86 supply operating current from supply $V_{dd}$ to inverters 82/84 and 88/90, respectively. Control voltage at node 94 is set by the voltage on capacitor 76, which is controlled by charging and discharging current definition elements 68 and 56, respectively, as discussed earlier. Likewise, control voltage at node 96 is set by the voltage on capacitor 78, which is controlled by charging and discharging current definition elements 70 and 58, respectively. Control voltages at nodes 94 and 96 control the conductivity of p-type transistors 80 and 86, respectively, which in turn controls the logic transition times of inverters 82/84 and 88/90. In other words, a lower control voltage at node 94, for example, allows transistor 80 to supply more current to inverter 82/84, which reduces the amount of time required for a low to high logic transition for signal $S_2$, for example. Additionally, a lower control voltage at node 96, for example, allows transistor 86 to supply more current to inverter 88/90, which reduces the amount of time required for a low to high logic transition for signal $S_1$, for example. It can be seen, therefore, that a variable delay is established for signals $S_1$ and $S_2$ by varying the control voltage at the gate terminals of transistors 86 and 80, set by capacitors 78 and 76, respectively. A smaller delay is programmed by smaller control voltages at nodes 94 and 96 and a larger delay is programmed by larger control voltages at nodes 94 and 96. The variable delay of switch control 12 is therefore programmed by the ratio of capacitor charge time to capacitor discharge time, which is in turn controlled by the on time of transistor 16 to the dead time, as discussed earlier.

Returning to FIG. 3, gate drive signal $G_1$ transitions from a logic high to a logic low at the beginning of time 44, in response to signal $ON_{16}$. Gate drive signal $G_1$ is a buffered version of signal $ON_{16}$, where the buffer exists within logic 92. The buffered $ON_{16}$ signal is required due to the large current requirements of the gate terminal of transistor 16. Signal $ON_{16}$ is provided as feedback to inverter 82/84 as shown in FIG. 4. Signal $S_2$ transitions from a logic low to a logic high, in response to the $ON_{16}$ signal, after a programmed delay. The programmed delay being set by the conductivity of transistor 80 as discussed above. Logic 92 transitions signal $G_2$ from a logic low to a logic high, in response to signal $S_2$, as shown at the beginning of time 46, thereby rendering transistor 18 conductive. Signal G2 is a buffered version of signal $ON_{18}$ to accommodate the gate terminal current requirements of transistor 18. Conversely, the beginning of time 48 shows signal $G_2$ transitioning from a logic high to a logic low. Signal $ON_{18}$ is provided as feedback to inverter 88/90, which causes signal $S_1$ to transition from a logic low to a logic high after a programmed delay. The programmed delay being set by the conductivity of transistor 86 as discussed earlier. $G_1$, in response to $S_1$ as provided by logic 92, transitions from a logic low to a logic high, which renders transistor 16 conductive, at the beginning of time 50. It can be seen, therefore, that a programmable amount of delay is used to set the duration of times 44 and 48. Dead times 44 and 48 insure that transistors 16 and 18 are not conductive simultaneously, which provides protection from shoot-through current conditions as discussed earlier. Minimization of dead times 44 and 48 reduces the amount of power dissipated by converter 10, thereby increasing the efficiency of converter 10.

Transistors 52 and 54 are conductive during first and second $V_{LX}$ flyback voltages during dead times 44 and 48. Dead time 44 defines a first $V_{LX}$ flyback voltage and dead time 48 defines a second $V_{LX}$ flyback voltage. In order to prevent current mirrors 60/62 and 72/74 from being conductive at the same time due to the operation of transistors 52 and 54, respectively, transistors 98 and 100 are used to activate and deactivate current mirrors 60/62 and 72/74, respectively. Transistors 98 and 100 are employed to activate current mirrors 60/62 and 72/74, depending upon which $V_{LX}$ flyback voltage is active. Signal TRIG is asserted by logic 92, when transistor 16 is conductive. Asserting signal TRIG allows transistor 98 to become conductive, which disables current mirror 60/62. Signal TRIG complement, is asserted by logic 92, when transistor 16 is non-conductive. Asserting signal TRIG complement, allows transistor 100 to become conductive, which disables current mirror 72/74. Transistor 98 is used in combination with signal TRIG to de-activate current mirror 60/62 when transistor 16 is conductive and transistor 98 is used to activate current mirror 60/62 when transistor 16 is non-conductive. Conversely, transistor 100 in combination with signal TRIG complement is used to de-activate current mirror 72/74 when transistor 16 is non-conductive and to activate current mirror 72/74 when transistor 16 is conductive.

Figure 6:
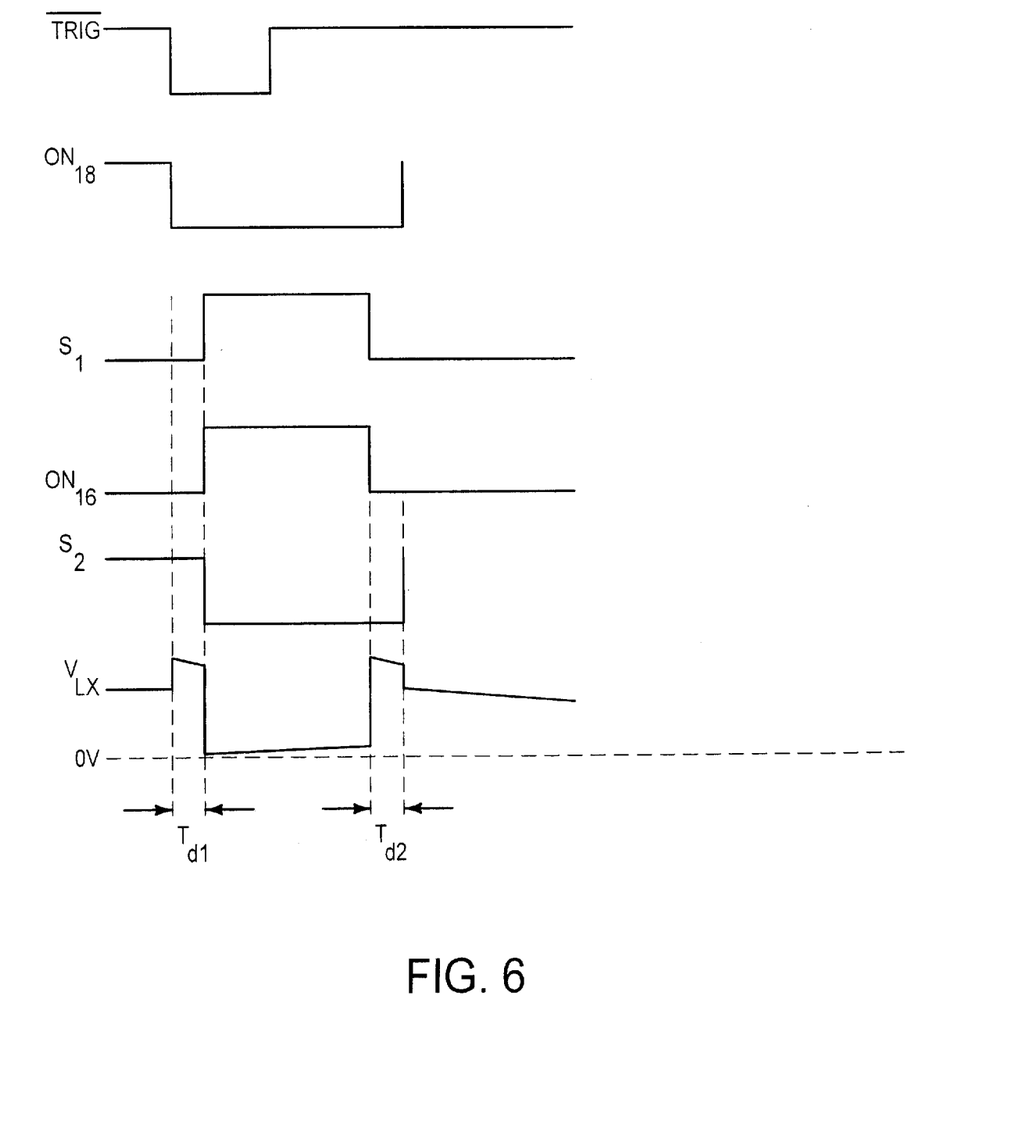
FIG. 6 is a timing diagram illustrating the operation of the switch control circuit of FIG. 4.

FIG. 6 presents a timing diagram, illustrating the timing relationships which control first dead time $T_{d1}$ and second dead time $T_{d2}$. Signal TRIG complement is an initialization pulse transmitted from a one-shot internal to logic 92. The complement signal to TRIG complement, TRIG, is also transmitted by the one-shot internal to logic 92. TRIG complement is the initialization pulse to begin operation of converter 10. The logic high to logic low transition of TRIG complement causes signal $ON_{18}$ to also transition from a logic high to a logic low, which in turn causes gate drive signal $G_2$ to transition to a logic low, causing transistor 18 to transition into a non-conductive state. A delay, $T_{d1}$, exists between signal $ON_{18}$ transitioning from logic high to logic low and signal $S_1$ transitioning from a logic low to a logic high. The delay, $T_{d1}$, as discussed above, is set by the control voltage at node 96, which is in turn set by capacitor 78. As noted earlier, a smaller control voltage at node 96 reduces the width of $T_{d1}$ and a larger control voltage at node 96 increases the width of $T_{d1}$. $ON_{16}$ transitions to a logic low, rendering transistor 16 non-conductive, in response to the duty cycle control scheme. The duty cycle control scheme (not shown) exists within logic 92 and is either a Pulse Width Modulation (PWM) or a Pulse Frequency Modulation (PFM) scheme. Other error detection signals such as over-current or thermal shutdown, for example, may be responsible for rendering transistor 16 non-conductive. Once transistor 16 is rendered non-conductive, signal $S_2$ transitions from a logic low to a logic high after delay $T_{d2}$. The delay, $T_{d2}$, as discussed above, is set by the control voltage at node 94, which is in turn set by capacitor 76. As noted earlier, a smaller control voltage at node 94 reduces the width of $T_{d2}$ and a larger control voltage at node 94 increases the width of $T_{d2}$.

During the time that signal TRIG complement is at a logic low, current from current definition element 58 is allowed to mirror from transistor 72 to transistor 74, so as to discharge capacitor 78 causing the voltage at node 96 to decrease. When signal $ON_{16}$ is at a logic high, indicating a time Ton that transistor 16 is conductive, p-type transistor 66 is rendered conductive, thereby allowing current to flow into capacitor 78, causing the voltage at node 96 to increase. At steady state, charge stored by capacitor 78 equals charge discharged by capacitor 78 such that, $(N-1)*I*T_{d1}=I*T_{on}$.

As discussed above, the amount of current supplied by current definition element 58 is N times the amount of current supplied by current definition element 70, therefore, the N*I term represents the current supplied by current definition element 58 and I represents the amount of current supplied by current definition element 70. Solving for $T_{d1}$, $T_{d1}=T_{on}/(N-1)$, where increasing values of N forces the width of dead time $T_{d1}$ to decrease. Decreasing time $T_{d1}$ reduces the amount of time that the intrinsic body diode of transistor 18 remains on, thereby reducing the amount of power dissipated by the body diode. An important feature of switch control 12 is the reduction of power dissipated by the intrinsic body diode of transistor 18, which increases the efficiency of converter 10. Setting N=200 and Ton=1 micro-second (us), for example, $T_{d1}$ is approximately equal to 5 nano-seconds (ns).

During the time that signal TRIG complement is at a logic high, signal TRIG is at a logic low and current from current definition element 56 is allowed to mirror from transistor 60 to transistor 62, so as to discharge capacitor 76, causing the voltage at node 94 to decrease. When signal $ON_{16}$ is at a logic high, indicating a time $T_{on}$ that transistor 16 is conductive, p-type transistor 64 is rendered conductive, thereby allowing current to flow into capacitor 76, causing the voltage at node 94 to increase. At steady state, charge stored by capacitor 76 equals charge discharged by capacitor 76 such that, $N*I*T_{d2}=I*T_{on}$. As discussed above, the amount of current supplied by current definition element 56 is N times the amount of current supplied by current definition element 68, therefore, the N*I term represents the current supplied by current definition element 56 and I represents the amount of current supplied by current definition element 68. Solving for $T_{d2}$, $T_{d2}=T_{on}/N$, where increasing values of N forces the width of dead time $T_{d2}$ to decrease. Decreasing time $T_{d2}$ reduces the amount of time that the intrinsic body diode of transistor 18 remains on, thereby reducing the amount of power dissipated by the body diode. An important feature of switch control 12 is the reduction of power dissipated by the intrinsic body diode of transistor 18, which increases the efficiency of converter 10. Setting N=200 and $T_{on}$=1 micro-second (us), for example as before, $T_{d2}$ is equal to 5 nano-seconds (ns).

By now it should be appreciated that a circuit and method has been presented that increases the efficiency of a synchronous buck or boost converter. Shoot-through current caused by simultaneous conduction states of the main and synchronous transistors is eliminated by establishing dead times. The dead times are then minimized to maximize the efficiency of the converter by reducing the amount of power dissipated by the intrinsic body diode of the synchronous transistor.

What is claimed is:

1. A synchronous power converter controlling simultaneous non-conductive states of first and second transistors, comprising:

a first delay control circuit coupled to receive the first timing signal and coupled to minimize a first simultaneous conductive state;

a second delay control circuit coupled to receive the second timing signal and coupled to minimize a second simultaneous conductive state; and a charge control circuit coupled to receive first and second control signals indicative of first and second conduction states of the first and second transistors and coupled to provide first and second timing signals, wherein the charge control circuit comprises a first current mirror coupled to receive the first control signal and coupled to provide a first phase of the first timing signal at a first node, a second current mirror coupled to receive the second control signal and coupled to provide a first phase of the second timing signal at a second node, a first current definition device coupled to the first node to provide a second phase of the first timing signal, and a second current definition device coupled to the second node to provide a second phase of the second timing signal.

2. The synchronous power converter of claim 1 wherein an amount of current conducted by the second current mirror is larger than an amount of current conducted by the second current definition device.

3. The synchronous power converter of claim 1 wherein an amount of current conducted by the first current mirror is larger than an amount of current conducted by the first current definition device.

4. The synchronous power converter of claim 1 wherein the first delay control circuit comprises:

a capacitor coupled to receive the first timing signal and coupled to provide a first control voltage; and a transistor having a control terminal coupled to receive the first control voltage.

5. The synchronous power converter of claim 4 wherein the first control voltage proportionally controls a first delay value produced by the first delay control circuit.

6. The synchronous power converter of claim 1 wherein the second delay control circuit comprises:

a capacitor coupled to receive the second timing signal and coupled to provide a second control voltage; and a transistor having a control terminal coupled to receive the second control voltage.

7. The synchronous power converter of claim 6 wherein the second control voltage proportionally controls a second delay value produced by the second delay control circuit.

8. A synchronous power conversion circuit preventing simultaneous conductive states of first and second transistors, comprising:

a first delay circuit coupled to receive a first feedback signal indicative of the conductive state of the second transistor and coupled to provide a second feedback signal, wherein the first delay circuit comprises a first current definition circuit coupled to a first node to provide a charging signal, a second current definition circuit coupled to the first node to provide a discharging signal, a variable delay logic circuit having a delay control terminal coupled to the first node; and a second delay circuit coupled to receive the second feedback signal indicative of the conduction state of the first transistor and coupled to provide the first feedback signal, wherein first and second delay circuits prevent the simultaneous conductive states of the first and second transistors.

9. The synchronous power conversion circuit of claim Wwherein the second delay circuit comprises:

a first current definition circuit coupled to a second node to provide a charging signal;

a second current definition circuit coupled to the second node to provide a discharging signal; and a variable delay logic circuit having a delay control terminal coupled to the second node.

10. The synchronous power conversion circuit of claim 9 wherein the second delay circuit further comprises a current mirror coupled to the second node to conduct an amount of current greater than an amount of current conducted by the first current definition circuit.

11. The synchronous power conversion circuit of claim 8 wherein the first delay circuit further comprises a current mirror coupled to the first node to conduct an amount of current greater than an amount of current conducted by the first current definition circuit.

12. A method of operating a synchronous power conversion circuit, comprising:

receiving a first feedback signal indicative of a first conduction state of a first transistor;

delaying the first feedback signal to provide a second control signal to control the conduction state of a second transistor, wherein delaying the first feedback signal comprises increasing a bias current of a first logic circuit to decrease a delay of the first logic circuit, and decreasing the bias current of the first logic circuit to increase the delay of the first logic circuit, receiving a second feedback signal indicative of the conduction state of the second transistor; and delaying the second feedback signal to provide a first control signal to control the conduction state of the first transistor.

13. The method of claim 12 wherein delaying the second feedback signal comprises:

increasing a bias current of a second logic circuit to decrease a delay of the second logic circuit; and decreasing the bias current of the second logic circuit to increase the delay of the second logic circuit.

14. The method of claim 13 wherein increasing the bias current comprises decreasing a control voltage of the second logic circuit.

15. The method of claim 13 wherein decreasing the bias current comprises increasing a control voltage of the second logic circuit.

16. The method of claim 12 wherein increasing the bias current comprises decreasing a control voltage of the first logic circuit.

17. The method of claim 12 wherein decreasing the bias current comprises increasing a control voltage of the first logic circuit.

* * * * *

UNITED STATES PATENT AND TRADEMARK OFFICE
CERTIFICATE OF CORRECTION

PATENT NO.    : 6,515,463 B2
DATED         : February 4, 2003
INVENTOR(S)   : Hok Sun Ling It is certified that error appears in the above-identified patent and that said Letters Patent is hereby corrected as shown below:

<u>Column 10,</u>
Line 2, first word, change "Wwherein" to -- 8 wherein --.

Signed and Sealed this

Twenty-fifth Day of March, 2003

JAMES E. ROGAN
*Director of the United States Patent and Trademark Office*